United States Patent [19]

Rohrle

[11] Patent Number: 5,503,595
[45] Date of Patent: Apr. 2, 1996

[54] TORSION DAMPING DEVICE FOR A MOTOR VEHICLE, BEING IN PARTICULAR A DOUBLE DAMPED FLYWHEEL OR A CLUTCH FRICTION WHEEL

[75] Inventor: Dieter Rohrle, Montmorency, France

[73] Assignee: Valeo, Paris, France

[21] Appl. No.: 19,294

[22] Filed: Feb. 18, 1993

[51] Int. Cl.⁶ .............................. F16D 3/12; F16F 15/12
[52] U.S. Cl. ........................................ 464/68; 464/66
[58] Field of Search ..................... 464/68, 67, 66, 464/92, 87, 96; 192/106.1; 74/574

[56] References Cited

U.S. PATENT DOCUMENTS

| 1,964,054 | 6/1934 | Harris | 464/92 |
| 2,065,601 | 12/1936 | Meyer | 464/66 |
| 2,299,029 | 10/1942 | Nutt | 192/106.1 |
| 2,557,511 | 6/1951 | Oles . | |
| 3,039,578 | 6/1962 | Péras | 192/106.1 |
| 3,428,155 | 2/1969 | Binder et al. | 464/608 |
| 3,514,974 | 6/1970 | Adachi | 464/68 |
| 3,628,353 | 12/1971 | Armstrong | 192/106.1 |
| 4,592,460 | 6/1986 | Kittel | 192/106.2 |
| 4,635,780 | 1/1987 | Wiggen | 464/68 |
| 4,714,448 | 12/1987 | Focqueur et al. | 464/68 |

FOREIGN PATENT DOCUMENTS

| 1454232 | 10/1966 | France . |
| 3107371 | 9/1982 | Germany . |
| 3114282 | 11/1982 | Germany . |
| 3931429 | 4/1990 | Germany . |
| 2160296 | 12/1985 | United Kingdom . |

*Primary Examiner*—Daniel P. Stodola
*Assistant Examiner*—Eileen A. Dunn
*Attorney, Agent, or Firm*—Longacre & White

[57] ABSTRACT

A torsion damper device comprises two coaxial parts, a circumferentially acting resilient element, and a friction device which acts in an axial sense between the two coaxial parts. The friction device includes a friction ring which is in contact with a first friction surface. The friction device is a unitary assembly which comprises at least one element of elastic material. The friction ring is secured over at least one of the faces of the elastic element. This unitary assembly is interposed, so as to be gripped axially, between the first friction surface and a second surface, while an anti-wear element acts between the elastic element and the second surface.

10 Claims, 7 Drawing Sheets

FIG.6
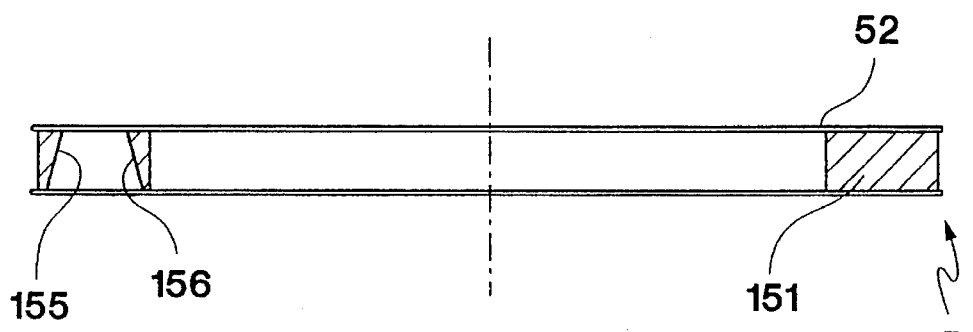
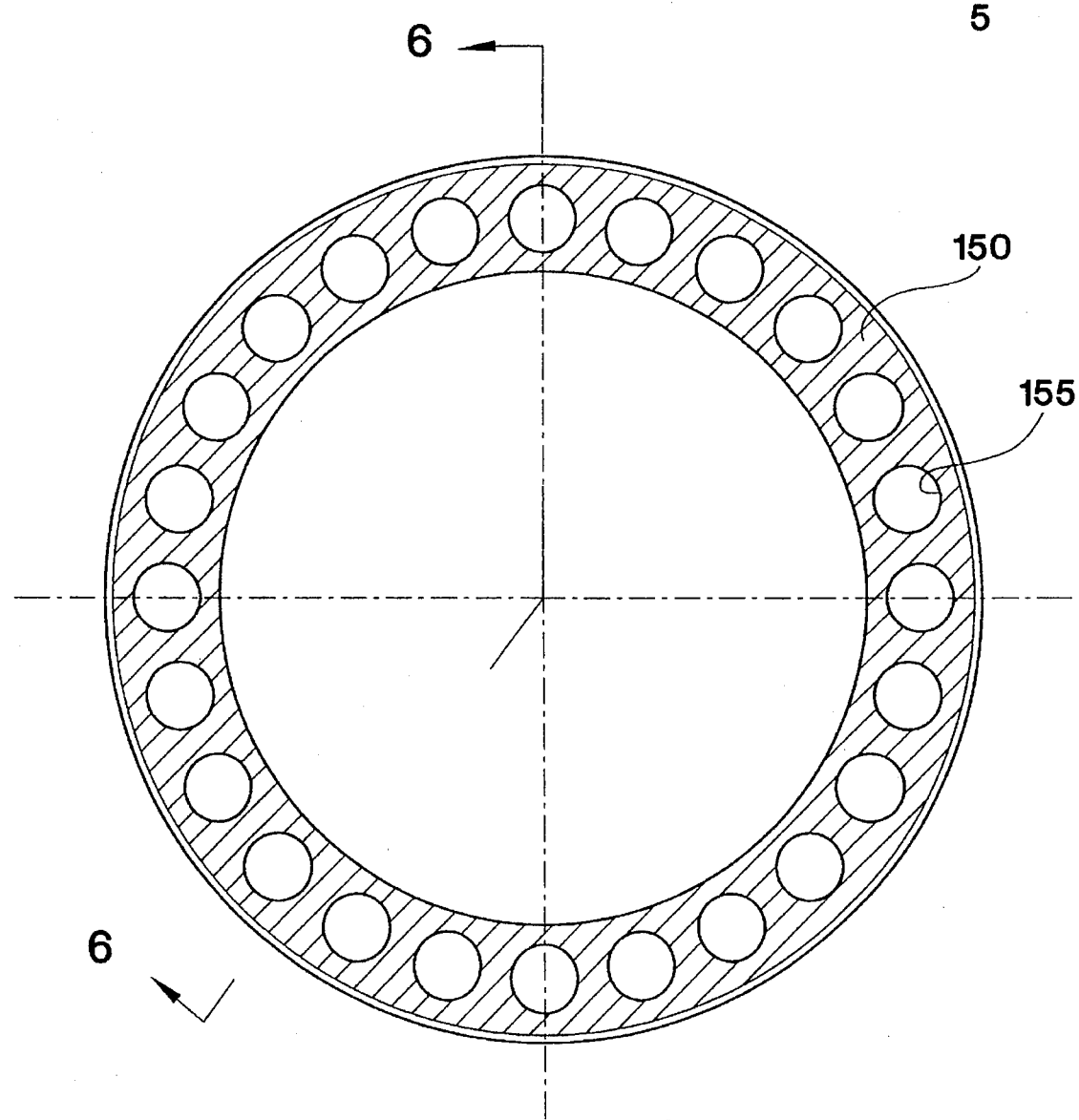
FIG.5

TORSION DAMPING DEVICE FOR A MOTOR VEHICLE, BEING IN PARTICULAR A DOUBLE DAMPED FLYWHEEL OR A CLUTCH FRICTION WHEEL

FIELD OF THE INVENTION

The present invention relates to torsion damping devices, variously referred to as torsion dampers, especially but not exclusively for use in motor vehicles, being of the kind comprising two coaxial parts which are mounted for limited relative rotation of one with respect to the other against the action of circumferentially acting resilient means, the torsion damper also including a friction device which acts in an axial sense between the two said coaxial parts.

BACKGROUND OF THE INVENTION

A damper of the above kind is described in the specification of United Kingdom published patent application GB 2 160 296A, in which one of the said coaxial parts comprises a first flywheel mass that includes a central hub, while the other coaxial part consists of a second flywheel mass which includes a plate carrying an outer hub internally, with the outer hub partly surrounding the central hub of the other coaxial part. A circumferentially acting torsion damper couples the first mass to the said plate of the second mass.

This friction device acts in the axial direction between the first and second flywheel masses, and includes a friction ring which is in frictional contact, through one of its side faces, with a first lateral friction surface which is fixed with respect to the first mass. The arrangement also includes a Belleville ring and an application ring which are driven in rotation without any clearance, by interengagement with a set of spacer bars which are part of the torsion damper.

Thus the friction device exerts a deflecting or biassing force on these spacer bars. These latter are quite long, so that the solidity of the torsion damper may be adversely affected. In addition, the effective area of the friction surface may not be as large as is desirable, because it is interrupted locally by passages to enable the spacer bars to be secured; while, in addition, the application ring is large, and this increases its cost.

Furthermore, the friction device consists of a large number of separate components, which complicates the assembly process, while the friction device also acts permanently between the two coaxial parts of the torsion damper, exerting a frictional damping effect of constant value at the said first friction surface.

It may be desirable to have only a light damping effect at the onset of the relative angular displacement between the first and second coaxial parts, followed by a larger (and frictional) damping effect during a second phase of this angular displacement. It follows that it is desirable that the friction means should be able to act with a varying clearance.

According to the disclosure in the above mentioned United Kingdom patent specification GB 2 160 296A, this objective leads to the provision of a loose meshing arrangement between the spacer bars of the torsion damper and the application ring. This, however, also requires that the friction device should not become worn rapidly.

DISCUSSION OF THE INVENTION

An object of the present invention is to overcome these drawbacks in a simple and economic manner.

Another object of the invention is to provide a novel friction device which is very easy to fit and which has a continuous friction surface, while at the same time providing variable damping and having a long useful life.

According to the invention, a torsion damping device comprising two coaxial parts which are mounted for rotation of one with respect to the other against the action of circumferentially acting resilient means, together with a friction device which acts axially between the said parts, wherein the friction device includes a friction ring in frictional contact through one of its faces with a first lateral friction surface, which is fixed with respect to one of the said coaxial parts, is characterised in that the friction device forms a unitary assembly comprising at least one element of elastic material, having at least one of its lateral faces overlaid by, and secured to, the said friction ring for frictional contact with the said first friction surface, in that the said unitary assembly is gripped axially between the said first friction surface and a second lateral surface which is fixed with respect to the other one of the said coaxial parts, and in that anti-wear means are arranged to act between the said second surface and the element of elastic material, whereby to prevent any slipping contact between the said second surface and the said element of elastic material.

Due to the invention, fitting of the torsion damping device is simplified because the friction device is in the form of a unitary assembly. In addition, the first friction surface is continuous, and the same can be true of the second surface, in such a way that the torsion damping device is both robust and simple, there being no longer any need to provide a loose meshing means between the friction device and either one of the coaxial parts of the torsion damper.

The unitary assembly of the friction device produces other advantageous effects. Thus, during a first phase of the relative angular displacement between the two coaxial parts of the torsion damper, the damping effect is small, since it arises simply from the internal damping effect of the element of elastic material itself, this element being positively squeezed between the friction ring and the second friction surface. Here, no relative movement takes place between the friction ring and the first friction surface. This is because of the interposition, with axial gripping, of the unitary friction assembly between its two associated friction surfaces. This lack of any relative movement is also due to the fastening of the friction ring to the elastic element, which prevents any slipping movement between the elastic element and the friction ring.

In a second phase of the relative angular movement, the torque which is transmitted increases, and relative movement begins to take place between the friction ring and the first friction surface, so that the damping effect is itself increased and now becomes a frictional damping effect. Variable damping is thus obtained. This variable damping is of advantage in the context of a double flywheel with torsion damping (or double damped flywheel), in which it is desirable to have a strong damping effect during starting and stopping of the engine when passing through the resonant frequency. Due to the anti-wear means, the resilient element will not become worn in contact with the second coaxial part. The useful life of the torsion damper is thus long, while at the same time the number of components is reduced.

The elastic element preferably comprises a block of elastic material in the form of a ring, which is formed with at least one recess, or made hollow, such that its stiffness is reduced still more during the first phase of the relative angular displacement mentioned above.

The element of elastic material may be secured to the second lateral friction surface, for example by the use of a suitable adhesive. However, this element is preferably overlaid on its other lateral face with a second friction ring, which simplifies assembly even more. Thus the second friction ring, or the means whereby the elastic element is fastened to the second coaxial part of the torsion damper, constitute the anti-friction means provided in accordance with the invention. This leads to a long useful life.

It will be appreciated that the unitary friction assembly can be used as a seal for a cavity which is at least partially filled with grease for lubricating the circumferentially acting resilient means.

According to another feature of the invention, the friction device is fitted radially inwardly of the torsion damper itself.

Further features and advantages of the invention will appear more clearly from the description of preferred embodiments of the invention which follows, and which is given by way of example only and with reference to the accompanying drawings.

BRIEF DESCRIPTION OF THE DRAWINGS

FIG. 5 is a view similar to FIG. 3, but shows a second embodiment of the invention.

FIG. 6 is a view in cross section taken on the line 6—6 in FIG. 5.

DESCRIPTION OF PREFERRED EMBODIMENTS OF THE INVENTION

Figure 1:
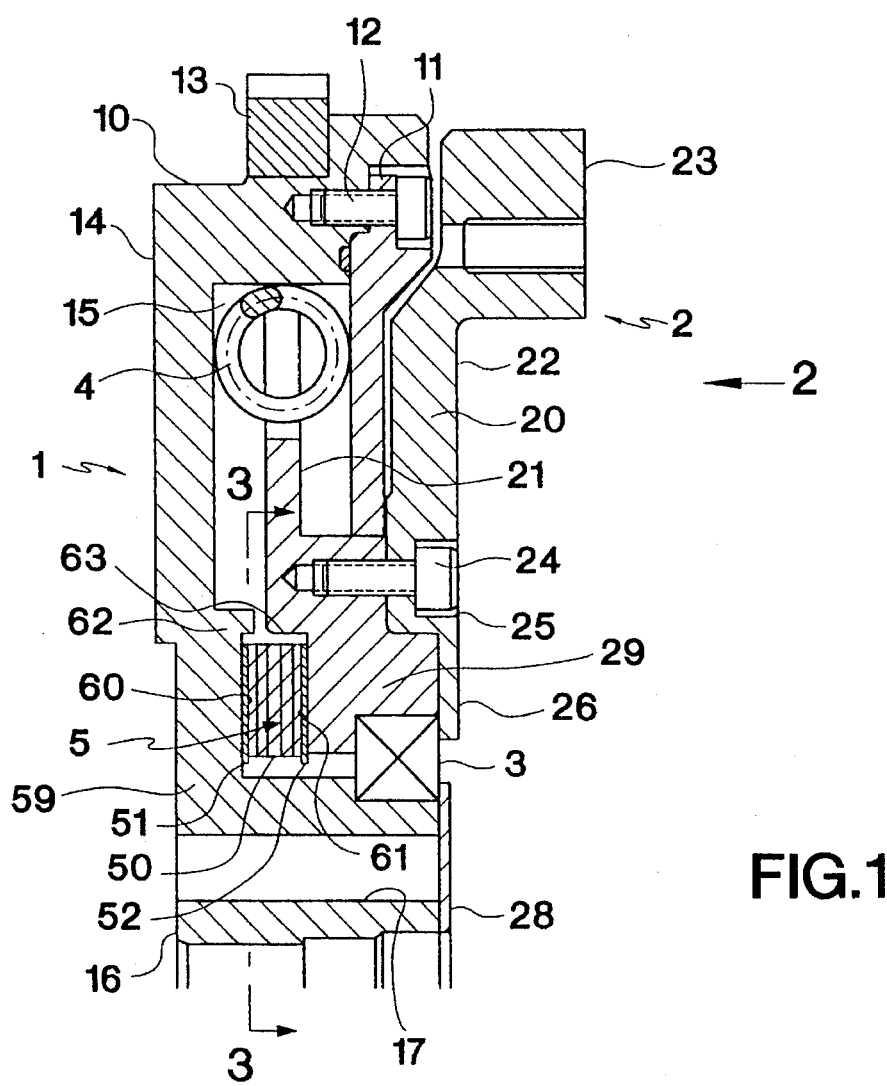
FIG. 1 is a half view in axial cross section of a torsion damper in the form of a double damped flywheel, in a first embodiment of the invention.
Figure 2:
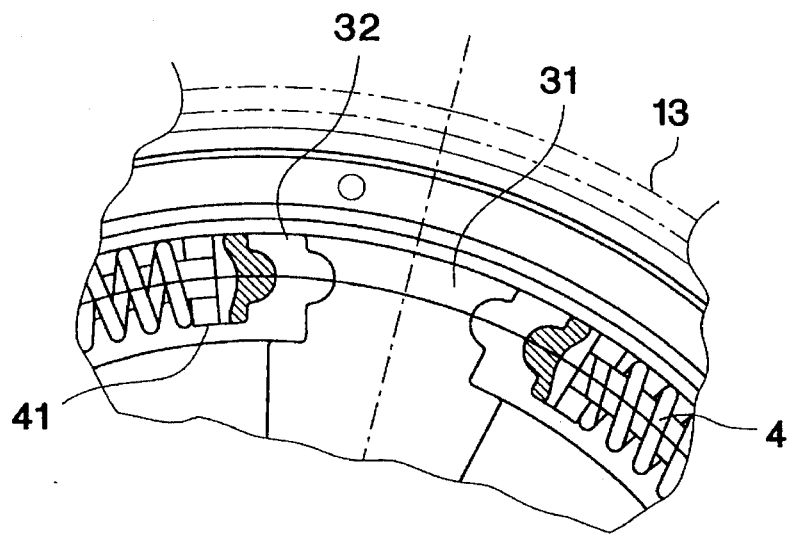
FIG. 2 is a partial view as seen in the direction of the arrow 2 in FIG. 1, with a cover plate and an annular plate, shown in FIG. 1, omitted.

The double damped flywheel as illustrated in various forms in FIGS. 1 to 10 is a double flywheel incorporating a torsion damper and intended for a motor vehicle. It is of the kind which includes a first rotating mass 1, a second rotating mass 2, a circumferentially acting torsion damper 4, 41, 32, 31, 21, and a friction device 5 which acts axially between the first mass 1 and the second mass 2. The first rotating mass 1 includes a central hub 16, while the second rotating mass 2 comprises an annular plate 20 which carries an outer hub 29 at its radially inner end. The outer hub 29 partly surrounds the central hub 16. The torsion damper couples the first rotating mass 1 to the annular plate 20 of the second mass 2, and includes a securing portion 21 which is secured to the annular plate 20 by means of fastening means 24.

The first rotating mass 1 is the torque input or driven part of the torsion damping device, while the second rotating mass 2 is its torque output or driving part.

In this example, the friction device 5 comprises a friction ring 52 which is in frictional contact with a transverse, lateral, friction surface 61 which is fixed with respect to the second mass 2. The second rotating mass 2 is mounted on the first mass 1, by means of anti-friction bearing means 3 which are interposed radially between the central hub 16 and the outer hub 29, so that the second mass is rotatable on the first mass. The friction device 5 surrounds the central hub 16.

More precisely, the first rotating mass 1 consists of generally annular components, namely a hollow housing 10, 14, which is of metal in this example and which includes a sealed, generally transverse, radial plate portion 14 which has an axially orientated flange 10 at its outer periphery. The central hub 16, together with a cover plate 11, are also part of the first rotating mass 1. The cover plate 11, together with the housing 10, 14, defines a sealed annular cavity 15 which is partly filled with grease. For this purpose, the cover plate 11 is sealingly fastened on the flange 10, in this example by means of studs 12. FIG. 1 shows a sealing ring inserted between the cover plate 11 and flange 10. A toothed starter crown 13, arranged to be driven by the starter (not shown) of the vehicle in the usual way, is secured around the flange 10.

The central hub 16 is fixed to the radial plate portion 14, which will be referred to for convenience in the rest of this description as the main plate and which defines the base portion of the housing 10, 14. The central hub 16 projects axially from the base portion 14, and in this example it is integral with the metallic housing. The latter is preferably made by casting.

The rotating mass 1 is coupled to the internal combustion engine of the motor vehicle, so as to be driven by the engine. To this end it is mounted on the crankshaft of the engine by means of screws (not shown), which pass through passages 17 formed in the central hub 16.

The second rotating mass 2 is mounted on the input shaft of the gearbox of the vehicle, via the clutch, so that the gearbox input shaft rotates with the second mass when the clutch is engaged. To this end, the annular plate 20 constitutes the reaction plate of the clutch. The remainder of the clutch is not shown in the drawings, but it includes a clutch friction plate in the usual way, secured to the gearbox shaft for rotation with the latter and being engaged in frictional contact with the reaction plate when the clutch is engaged. For more details, reference is invited to the specification of United Kingdom published patent application GB 2 160 196A. In this example the reaction plate 20 is a casting and has a friction surface 22, together with a fastening surface 23 to which the cover plate of the clutch is fastened.

The second rotating mass 2 also includes an annular damper plate 21 (referred to above as a securing portion). The damper plate 21 is of metal in this example and is coupled in rotation to the reaction plate 20, extending into the cavity 15 axially between the base 14 of the housing of the first rotating mass and the cover plate 11. The damper plate 21 is part of the torsion damper, and in this example it is integral with the outer hub 29, projecting axially outwardly from the latter. The cover plate 11 extends radially inwardly so as to surround the outer hub 29, around which it fits with a clearance small enough to prevent escape of grease from the cavity 15.

The damper plate 21 of the torsion damper is formed with radial arms 31 (see FIG. 2), which are arranged to interfere between, and bear against, circumferentially acting resilient means 4 which are part of the torsion damper. In this example these resilient means 4 comprise a plurality of coil springs 4 of substantial length, which bear against projecting inserts 32. These inserts 32 are arranged in facing pairs, and are fixed to the cover plate 11 and the main plate 14, for example by sealed riveting or by welding. The inserts 32 are also part of the torsion damper, as are the arms 31. The inserts 32 are slotted for cooperation with thrust pads 41, against which the ends of the springs 4 are engaged. In the present example, the springs 4 are mounted without any clearance between themselves and the insert blocks, 32, but with a clearance with respect to the arms 31. The springs 4 may alternatively of course be mounted without clearance with respect to the arms 31, depending on the desired application. The springs 4 extend to the inner periphery of the flange 10, and are lubricated by the grease in the cavity 15, which increases their useful life.

The friction device 5 surrounds the central hub 16, on which the anti-friction bearing means 3 are mounted. In the present example the latter comprise a ball bearing with a single ball race. However, in a modification, the bearing means 3 may consist of a bearing having two ball races, as disclosed in the specification of published United Kingdom patent application GB 2 160 296A; or they may comprise a journal bearing of a suitable anti-friction material.

The bearing 3 is interposed radially between the central hub 16 and the outer hub 29 fixed to the reaction plate 20, being carried on the latter by the fastening means 24 already mentioned. The outer hub 29 extends as far as the inner periphery of the reaction plate 20, and has an internal bore which is formed with a shoulder for engagement with the outer ring of the bearing. The latter is engaged in the bore of the outer hub 29, on which it is located axially by the above mentioned shoulder, and by an inward radial extension 26 of the reaction plate 20.

The bearing 3 is located axially on the hub 16, partly by means of a radial ring 28 and partly by means of a shoulder (visible in FIG. 1) which is defined by a change of external diameter of the central hub 16. The head of the fastening screws mentioned above, whereby the hub 16 is secured to the crankshaft of the engine, bear on the radial ring 28. The second rotating mass 2 is thus located axially on the first rotating mass 1, but is rotatable with respect to the latter by means of the anti-friction bearing 3.

It will be observed that the friction ring 52 of the friction device 5 is in frictional contact, through one of its faces, with the lateral (or radial) friction surface 61 (which may be referred to as a first friction surface), the latter being fixed with respect to one of the two rotating parts 1, 2 of the flywheel (in this example the part comprising the rotating mass 2).

The friction device 5 forms a unitary assembly which comprises at least one element 50 of elastic material. The friction ring 52 is secured to at least one of the lateral faces of the element 50 so as to cover that face. This unitary assembly 5 is interposed, and axially gripped, between the first friction surface 61 and a second surface 60 which is fixed to the other one of the two parts of the flywheel (in this example the rotating mass 1). In addition, anti-wear means act between the second friction surface 60 and the element 50 of elastic material, so as to prevent any slip occurring between the second surface 60 and the element 50.

In this example, the second friction surface 60 is continuous, and is formed on a radial carrier plate element 59 which is slightly offset axially with respect to the main plate 14, from which it extends radially inwards. The carrier plate element 59 is in axial facing relationship with the first friction surface 61. The plate element 59 is part of an annular centring nose, which projects from the main plate 14 and which is directed axially towards the outer hub 29. The carrier plate element 59 also carries the central hub 16, which is both coaxial and integral with it, while the above mentioned centring nose is disposed at the inner periphery of the main plate 14.

The central part of the housing 10, 14 is thus of stepped configuration, defining at the outer periphery of the carrier plate element 59 a projecting collar element 62, which projects axially towards the outer hub 29 so as to define a radial shoulder for the unitary assembly 5. The face of the annular outer hub 29 that is directed towards the carrier plate element 59 is recessed. As will be seen from FIG. 1, in this example the second friction surface 60 extends transversely, and is defined by the transverse face of the carrier plate element 59 that is directed towards the outer hub 29. Again, the first friction surface 69 is defined by the lateral face of the outer hub 29 which is directed towards the carrier plate element 59, and in this example it extends transversely.

In FIGS. 1 to 4, the unitary friction assembly 5 is in the form of an annular block 50 of elastic material, which in this example is an elastomeric material such as rubber. In this example, besides the friction ring 52, there is a further friction ring 51, these rings being arranged to cover the respective lateral faces of the block of elastomeric material, to which they are fixed so as to make frictional contact with the corresponding friction surface 60 or 61. The friction device 5 is fitted radially inwardly of the damper plate 21, and its elastic block 50 constitutes a ring which is thicker than the rings 51 and 52.

The second lateral surface 60 is also a friction surface, being delimited externally by the annular collar element 62. As mentioned above, the outer hub 29 is recessed, so as to form the first friction surface 61, which is delimited on the outside by an axially oriented annular shoulder 63.

In this way, the collar element 62 and the shoulder 63 together act as a centring means which prevents displacement of the unitary assembly 5 due to centrifugal force, and which facilitates easy fitting of the assembly 5. In addition, the cavity 15 is sealed by the unitary assembly 5 in combination with the outer hub 29 and the centring nose (59, 62) of the housing. The friction rings 51 and 52, which in this example are identical to each other, can be fastened to the elastic block 50 adhesively, or, in a modification, by bonding. In the latter case, this may be done by in situ vulcanisation of the rubber of the block 50 on to the metallic rings 51 and 52. It will be appreciated that the rings 51 and 52 constitute the above mentioned anti-wear means, which prevent any slipping contact between the elastic block 50 and the respective friction surfaces 60 and 61.

Figure 4:
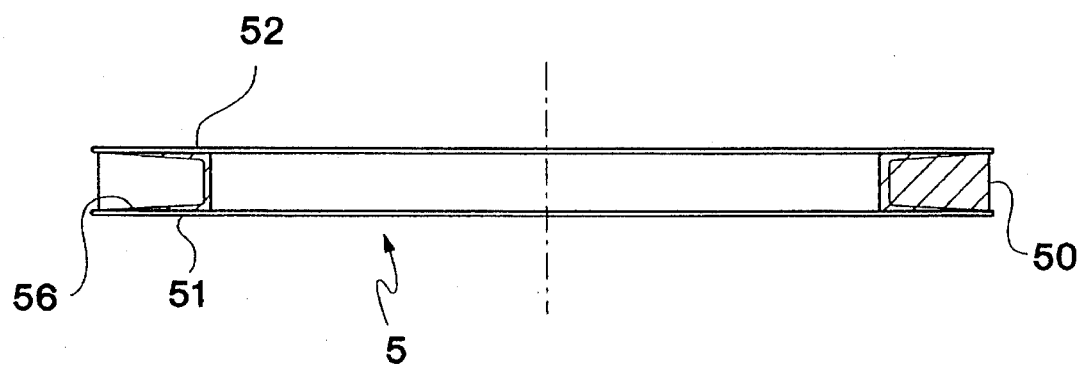
FIG. 4 is a view in cross section taken on the line 4—4 in FIG. 3.
Figure 3:
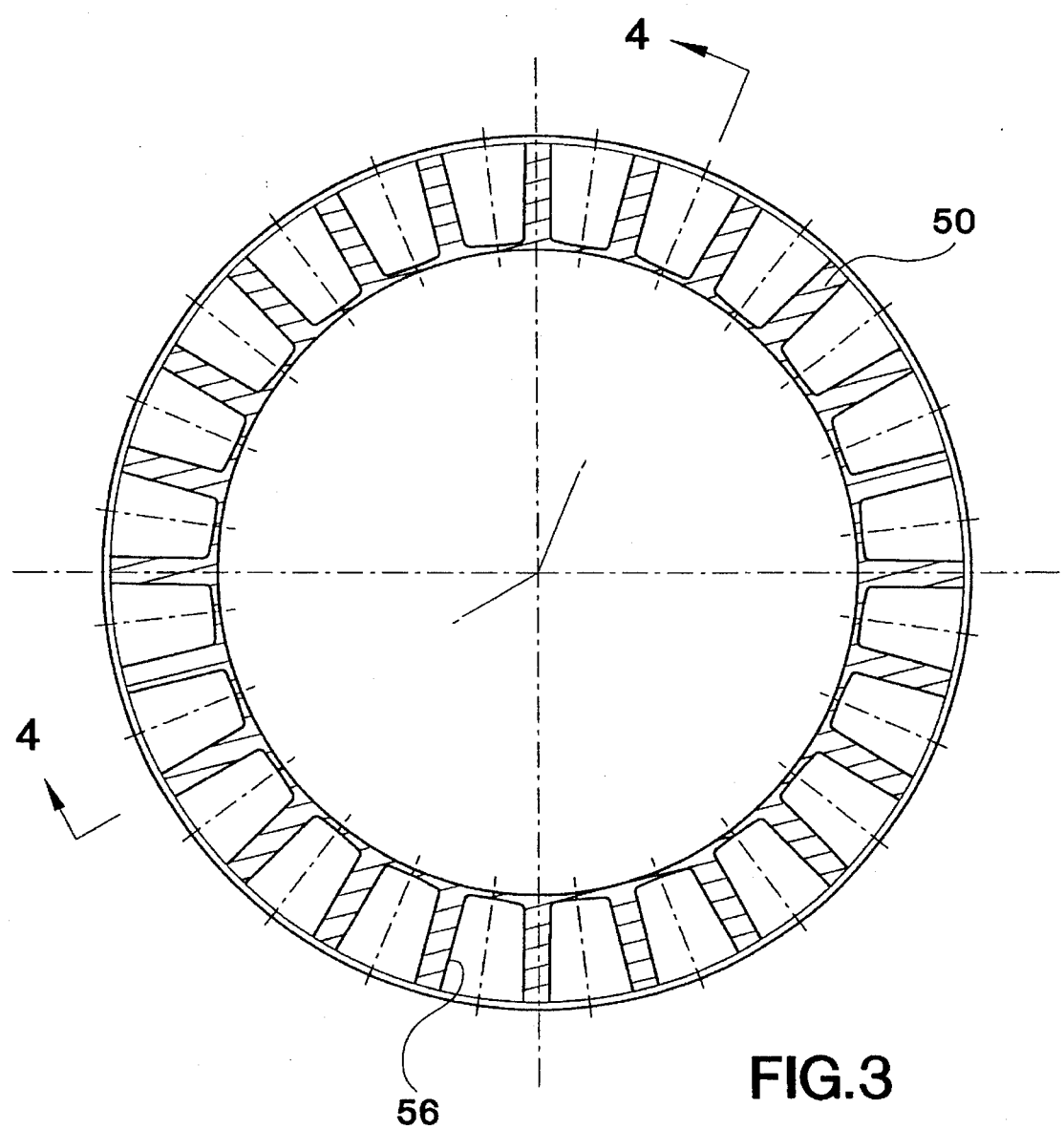
FIG. 3 is a view of the friction device of the torsion damper, shown in a cross section taken on the line 3—3 in FIG. 1.

The block 50 is best seen by itself in FIGS. 3 and 4. It is preferably formed with at least one recess, which may take various forms. In this embodiment this consists of a series of apertures 56, which as shown in these Figures are flared radially outwardly. These apertures 56 are oriented radially, and are in the form of blind holes which, in the present example, are frusto-conical in form, being open at the outer periphery of the block 50. These apertures reduce the axial and circumferential stiffness of the ring 50.

The double damped flywheel described above operates in the following way.

As the vehicle moves, the housing 10, 14 and the cover plate 11 first become displaced circumferentially with respect to the arms 31, thus displacing the springs 4 until the thrust pads 41 come into contact with the arms 31, the springs 4 then being compressed so as to couple the first rotating mass 1 circumferentially to the reaction plate 20. The relative angular displacement between the two rotating masses 1 and 2 is limited by inter-engagement of the turns of the springs 4.

During the relative angular displacement of the mass 1 with respect to the mass 2, the friction block 50 is compressed axially between the two friction surfaces 60 and 61. At first this gives a slight damping effect, without any relative movement of the friction assembly 5 with respect to the friction surfaces 60 and 61. This slight damping effect is due to the apertures 56 and to the internal damping of the rubber of the block 50, which is squeezed between the two rings 51 and 52.

As the relative angular displacement between the two rotating masses 1 and 2 increases, the torque transmitted, and also the damping effect, will also increase. A positive relative movement then occurs between the unitary friction assembly 5 and one of the friction surfaces 60 and 61, so that there is then a frictional damping effect.

During starting or stopping of the engine, the rotational velocity passes through the resonant frequency of the double flywheel, and a large angular displacement occurs between the first and second rotating masses, with the friction device 5 producing a high damping effect by friction, with one of the rings 51 and 52 rubbing in contact with one of the surfaces 60 and 61.

Thus, in order to damp vibrations when the engine is idling, a slight damping effect is available; whereas, with large relative angular displacements between the rotating masses 1 and 2, and particularly on stopping and starting of the engine of the vehicle, a much larger damping effect is made available by friction.

Referring now to FIGS. 5 and 6, the apertures in the annular block of elastic material may be oriented axially. In FIGS. 5 and 6 the block is indicated by the reference numeral 150, and the apertures by the numeral 156. In the present example the apertures 156 are again flared and are in the form of blind holes of generally frusto-conical shape; but in this case each aperture is open axially through a hole 155 which is formed in the metal ring 151 (corresponding to the ring 51 in FIG. 1) which makes frictional contact with the friction surface 60. The three blind holes are closed off by the other friction ring, 52.

Figure 8:
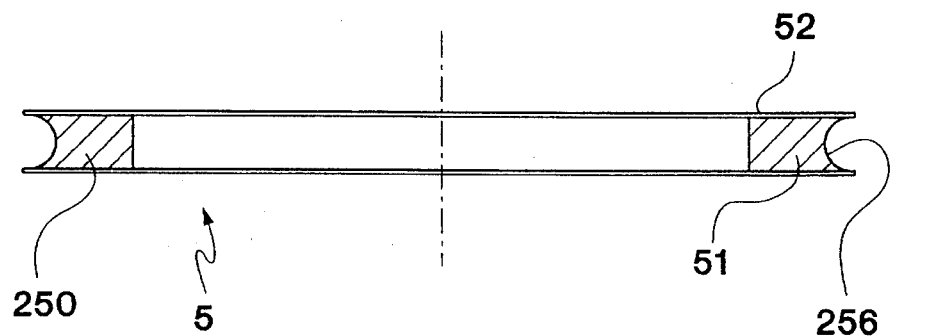
FIG. 8 is a view in cross section taken on the line 8—8 in FIG. 7.
Figure 7:
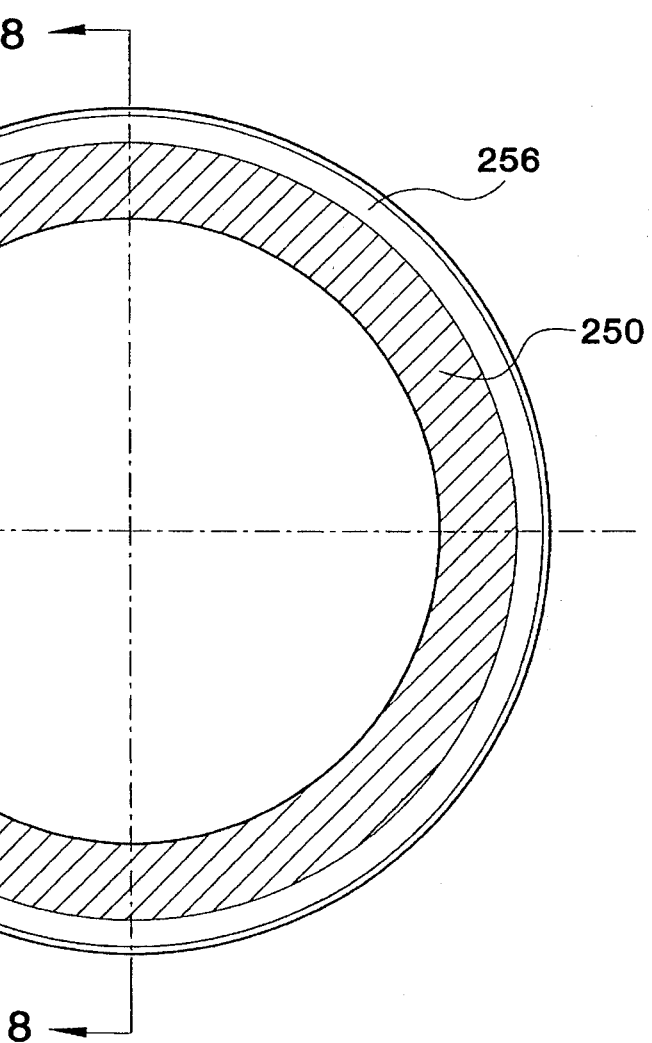
FIG. 7 is a view similar to FIG. 3, but shows a third embodiment of the invention.

Referring now to FIGS. 7 and 8, in this further embodiment the block of elastic material, here indicated by the reference numeral 250, has a single peripheral groove 256, which generally replaces and performs the same function as the apertures 56 in FIGS. 3 and 4 or 156 in FIGS. 5 and 6. In all of FIGS. 4 to 8, the ring-shaped block 50, 150 or 250 is easily made by moulding.

The reliable operation of the torsion damping device will be appreciated from the foregoing description. Thus if a gripping action takes place at one of the friction surfaces 60 or 61, the device is able to operate, with the friction occurring at the other friction surface without any wear of the block taking place.

Figure 9:
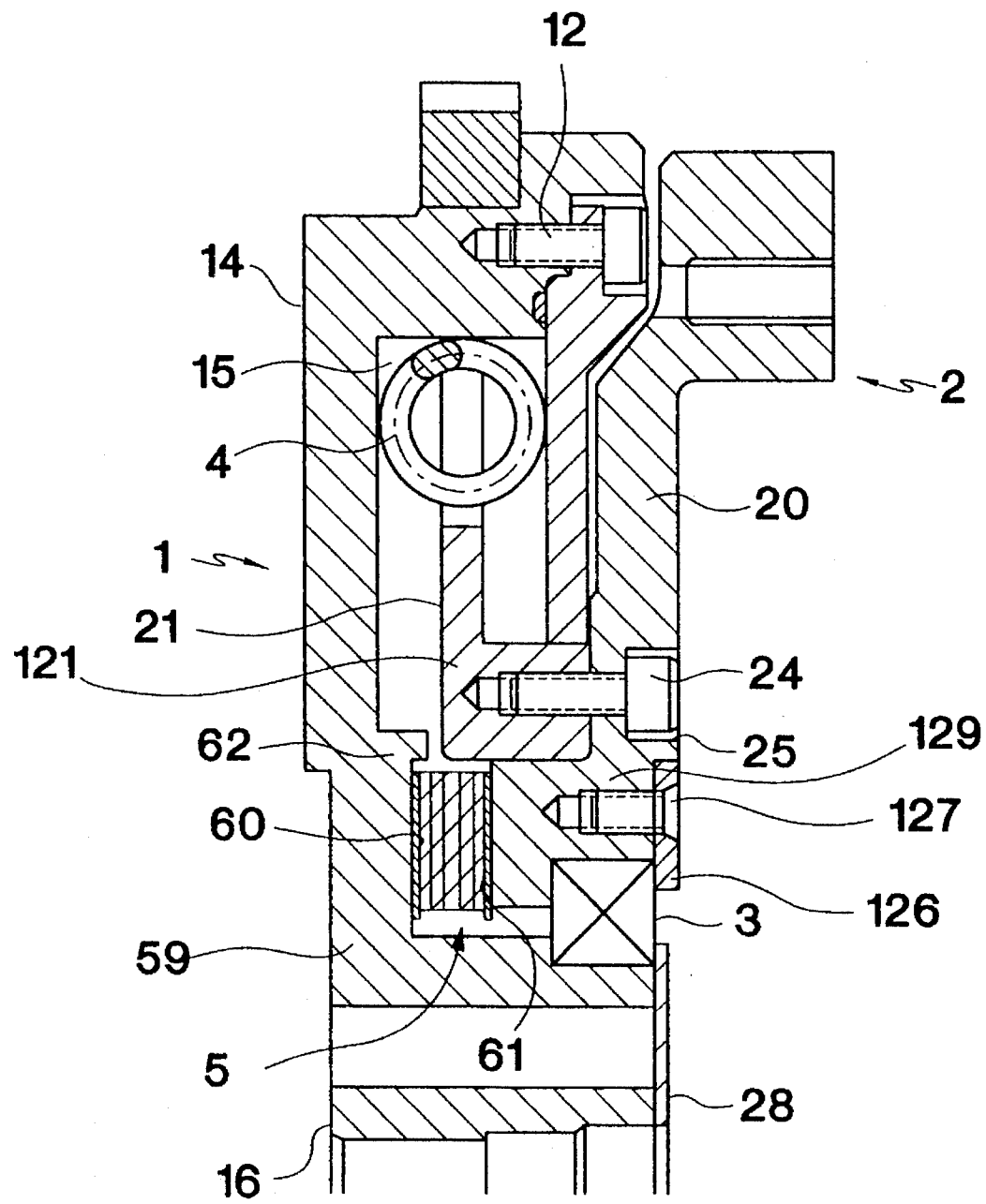
FIG. 9 is a half view in axial cross section similar to FIG. 1, but shows a fourth embodiment of the invention.
Figure 10:
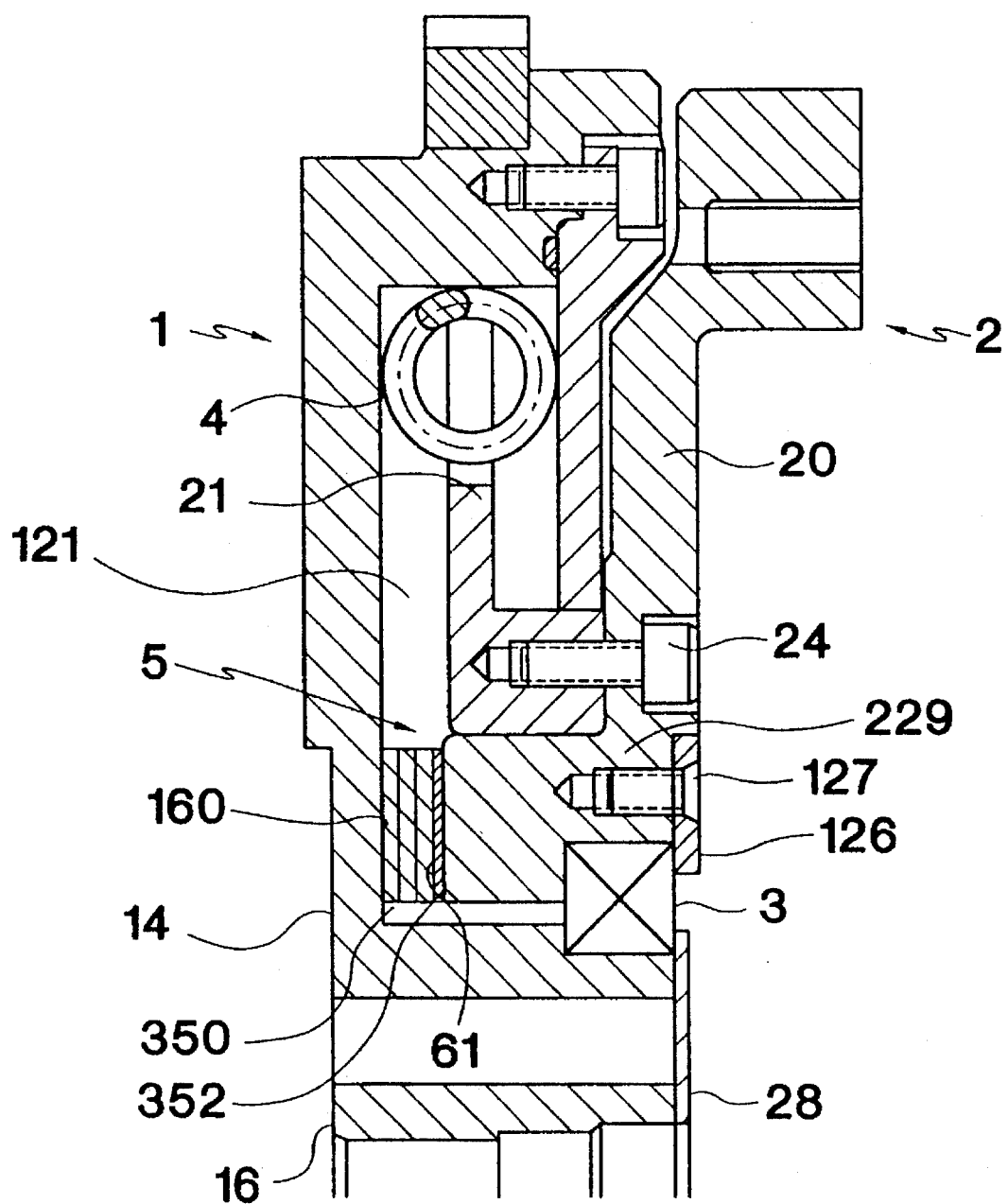
FIG. 10 is a half view in axial cross section similar to FIG. 1, but shows a fifth embodiment of the invention.
Figure 11:
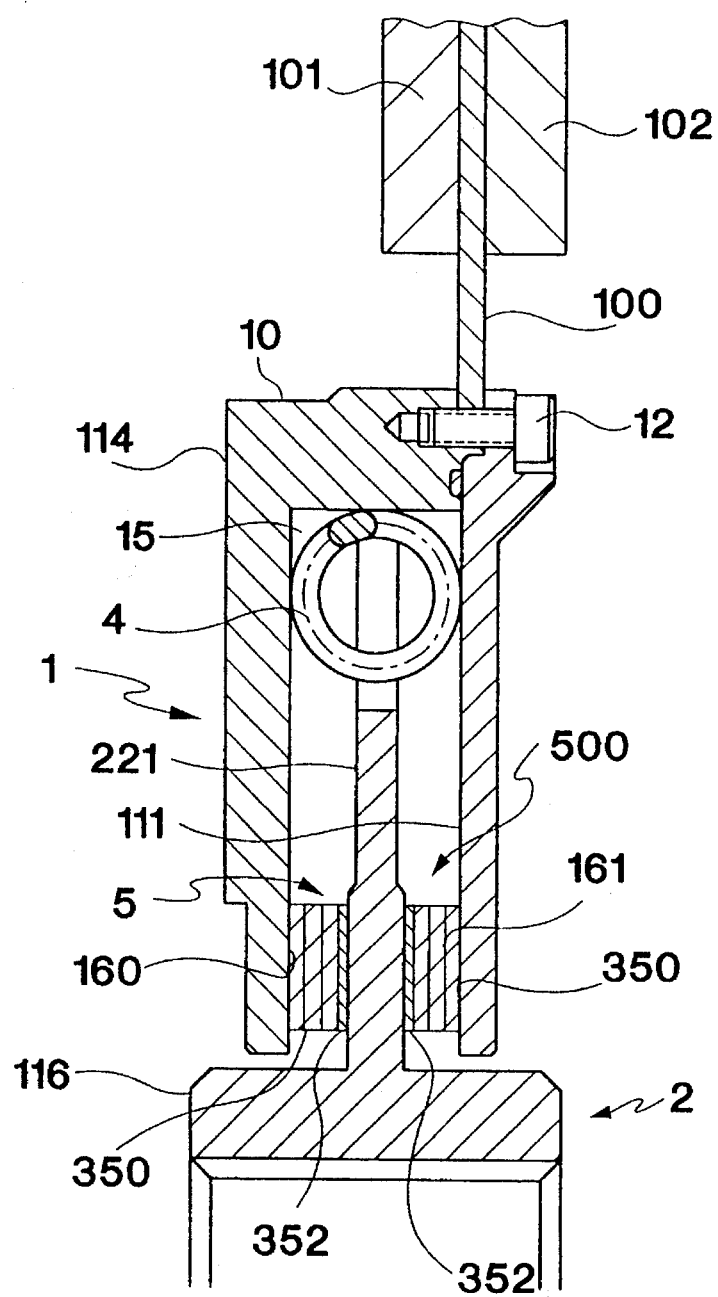
FIG. 11 is a half view in axial cross section similar to FIG. 1, but shows a sixth embodiment of the invention, as applied to a clutch friction wheel.

The present invention is of course not limited to the embodiments described above. For example, three further embodiments are shown in FIGS. 9 to 11. Referring first to FIG. 9, the damper plate 21 here has a cross section in the form of an L, the central portion 121 of which is of tubular shape, being secured by means of the studs 24 to the reaction plate 20. In this example the reaction plate 20 is integral with the outer hub 129 which is carried at the inner periphery of the reaction plate 20.

The outer hub 129 defines a centring nose for the central portion 121. A ring 126, carried on the outer hub 129, is secured to the latter by means of screws 127. The ring 126 thus defines the shoulder for the outer bearing ring of the bearing 3, which is also located axially by the internal shoulder of the outer hub 129. In this example there is metal-to-metal frictional contact at the level of the carrier plate element 59, the latter being preferably made of sheet metal, while the outer hub 129 is preferably a casting. As before, friction is able to occur at one of the two friction surfaces 60 or 61, and then at the other friction surface, and vice versa, during the useful life of the torsion damper, depending on the friction conditions which are variable with time. It will be noted that in this case, the shoulder 63 of FIG. 1 is omitted, the collar element 62 being enough to centre the unitary block 5.

In the embodiment shown in FIG. 10, the unitary assembly 5 consists simply of a block of elastic material 350, which is preferably formed with apertures. A friction ring 352, which overlies one of the lateral faces of the block 350, rubs frictionally against the appropriate side face of the outer hub 229, the latter being integral with the reaction plate 20 as in FIG. 9.

The outer hub 229 is extended axially by a greater amount than the hub 129 of FIG. 9, while the friction surface 160 of the first mass 1 in FIG. 10 is defined by the side face of the main plate 14 that faces towards the reaction plate 20. The block 350 is preferably secured to the main plate 14, the latter being of sheet metal, for example by adhesive attachment or by vulcanisation in situ. Thus the block 350 does not become worn, the ring 352 being in positive frictional contact with the outer hub 229. The means, such as an adhesive, whereby the block 350 is fastened constitute the anti-wear means in this case.

The torsion damper can of course consist of a clutch friction wheel, or clutch plate. Such an arrangement is shown in FIG. 11, in which the friction wheel, indicated at 100, is secured to the outer periphery of the flange 10 by means of the studs 12, the friction wheel 100 being secured axially between the cover plate 111 and the flange 10 by means of the studs 12. Friction pads 101, 102, which may be discontinuous, are carried on each face of the friction wheel 100. These friction pads are arranged to be gripped in the usual way between the pressure and reaction plates of the clutch.

In this case the cover plate 111 is extended inwardly, as is the central damper plate 221, with a further transverse device 500 being then interposed between the cover plate 111 and the damper plate 221. The latter is enlarged at its base for action of the two friction devices 5 and 500 of the type shown in FIG. 10. In this form of the friction device, the blocks 350, which are preferably hollow, are secured to the main plate 114 and the cover plate 111 (preferably by the use of a suitable adhesive), and more precisely to the associated side surfaces 160 and 161.

The damper plate 221 is secured to the central hub 116, which is a separate component from the main plate 114. This hub 116 has a splined internal bore for coupling it in rotation with the input shaft of the gearbox, and is therefore part of the second part of the torsion damping device.

The main plate 114 and the cover plate 111, surrounding the central hub 116 with a clearance here constitute (as in the preceding Figures) guide rings, and may be formed with windows in which the springs 4 are fitted. The latter, instead of being helical coil springs, may be in the form of a block of elastic material, and may in any case be arranged to act in a stepped manner as is already known.

As will be understood, the present invention is capable of a large number of applications. In all cases the unitary frictional assembly or assemblies close off the cavity 15 and thus act as a seal. The torsion damper is both robust and simple in construction.

The friction rings (or each friction ring) instead of being of metal, may of course be of any other appropriate friction material. In FIGS. 1 to 10 it will be noted that the unitary friction assembly 5 exerts an axial force on the bearing 3, which serves to feed the forces back in a closed loop. The central hub 16, and the outer hub, have no machined surfaces for driving any kind of application ring.

The structures may be inverted. Thus, in FIG. 1, the blocks of elastic material 50 may be secured, for example by use of an adhesive or by bonding, so as to define the anti-wear means, which are provided according to the present invention, to the damper plate 21; while the friction ring 52 may be in frictional engagement with the main plate 14 and the cover plate 11.

In FIGS. 3 to 6, the solid portions and the hollow portions may be inverted so that the elastic element is divided up and formed with gaps. Thus, in such a modification of the arrangement shown in FIGS. 3 and 4, the rings 52 and 51 may be joined together by means of a plurality of elements of elastic material in the form of pads which are elongated radially and spaced apart circumferentially at regular intervals. In a corresponding modification to the arrangement shown in FIGS. 5 and 6, the rings 52 and 151 may be joined together by means of elements of elastic material in the form of disc-shaped pads.

Similarly, the rings may be joined together through a plurality of concentric rings of elastic material. Apertures are then formed. In FIGS. 5 and 6, alternate apertures 156 may be open through alternate rings 52, 152, i.e. with half of the holes 155 formed in one of these rings and the other half in the other ring.

The block of elastic material may be made wider than its height. The lateral friction surfaces are not necessarily arranged transversely. Thus at least one of them may be frusto-conical in shape, with the unitary assembly then having at least one frustoconical side face, and the block itself having a frusto-conical side face.

Finally, the elastic element, whether or not it is divided up, may be of a reticulating elastic material which is adherent after being deposited. For example, in the case of concentric rings, the latter may be applied on to one of the rings, using a nozzle, so that adhesive bonding then takes place. A silicone paste may for example be used, such as that marketed by the company Rhône-Poulenc under the Trade Mark RHODORSEAL.

What is claimed is:

1. A torsion damper comprising:
   a first part;
   a second part;
   means mounting one of said first and second parts coaxially with respect to an other one of said first and second parts for relative rotation therebetween;
   circumferentially acting resilient means arranged between said first and second parts for resisting said relative rotation; and
   a friction device arranged between said first and second parts for acting in an axial sense therebetween, said one of said first and second parts defining a first lateral surface, and said friction device including at least one friction ring, said at least one friction ring having a lateral face in frictional contact with said first lateral surface;
   wherein the friction device is a unitary assembly further including at least one element of elastic material, said at least one friction ring overlying and secured to a first axial face of said elastic element and in said frictional contact with said first lateral surface, said first lateral surface being a friction surface,
   the other one of said first and second parts defining a second lateral surface, said first and second lateral surfaces being such that the unitary assembly is gripped axially therebetween, and
   the friction device further including anti-wear means so as to prevent any slipping contact between said second lateral surface and said elastic element.

2. A torsion damper according to claim 1, wherein the unitary assembly is secured to said second surface, whereby to define said anti-wear means.

3. A torsion damper according to claim 1, wherein said second lateral surface is a friction surface,
   the unitary assembly further includes at least one said elastic element having said first axial face and a second axial face, and first and second friction rings, each of said first and second friction rings overlying a respective one of said first and second axial faces for frictional contact with the first and second lateral surfaces respectively, and
   said second friction ring defines said anti-wear means and said first friction ring defines an additional anti-wear means between said first lateral surface and said elastic element.

4. A torsion damper according to claim 1, wherein said elastic element comprises an annular block of elastic material having at least one recess therein.

5. A torsion damper according to claim 4, wherein said at least one recess comprises a plurality of radially oriented blind holes open along a radially outer periphery of said block.

6. A torsion damper according to claim 4, having two friction rings, one on each of said first and second axial faces, at least one of said two friction rings being formed with through holes, and said at least one recess comprising a plurality of axially oriented blind holes, each of which is open axially through a respective one of said through holes.

7. A torsion damper according to claim 4, wherein the said at least one recess comprises a groove formed around the outer periphery of the elastic block.

8. A torsion damper according to claim 1 constituting a double flywheel with torsion damping, wherein said one of said first and second parts includes a first flywheel mass having an inner radial periphery, the other one of said first and second parts includes a second flywheel mass, said first flywheel mass having the second lateral surface proximate a central hub at said inner radial periphery, said second flywheel mass including an annular plate having an outer hub proximate a radially inner periphery, said first lateral surface being defined on the outer hub with the outer hub partially surrounding the central hub, the friction device surrounding the central hub, and the torsion damper further including anti-friction bearing means located radially between the outer hub and the central hub.

9. A double flywheel with torsion damping according to claim 8, wherein said first mass includes a housing and a cover plate secured to housing, the said housing and cover plate together defining an annular cavity, the circumferentially acting resilient means being mounted within said cavity, the cavity having an interior periphery and the friction device being disposed in the interior periphery of the cavity so as to close the cavity sealingly.

10. A torsion damper according to claim 1, constituting a clutch friction wheel and comprising a housing, a cover plate secured to the housing, and a central damper plate disposed between the housing and the cover plate, said unitary device being disposed partly between the damper plate and the housing and partly between the damper plate and the cover plate.

\* \* \* \* \*